J. E. BALL.
TAPER GAGE.
APPLICATION FILED JUNE 18, 1910.
996,901.
Patented July 4, 1911.
2 SHEETS—SHEET 1.
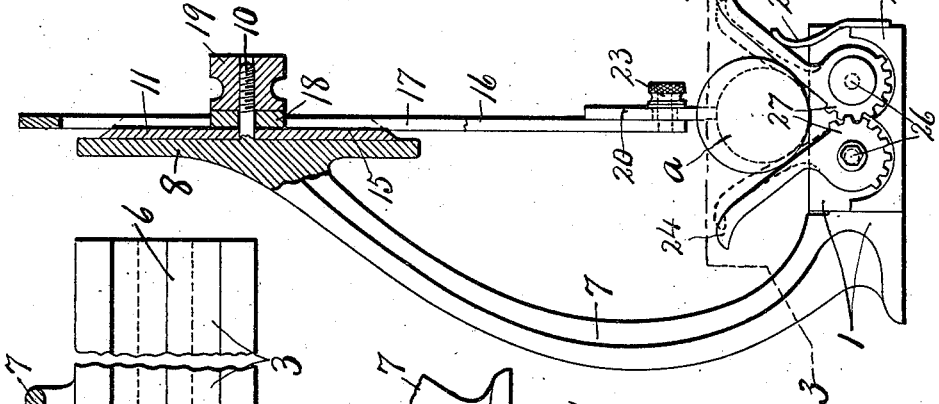
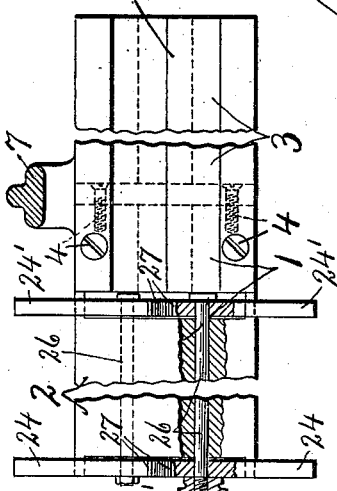
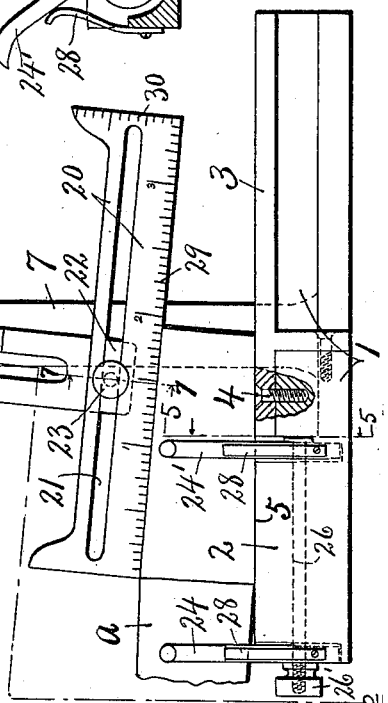
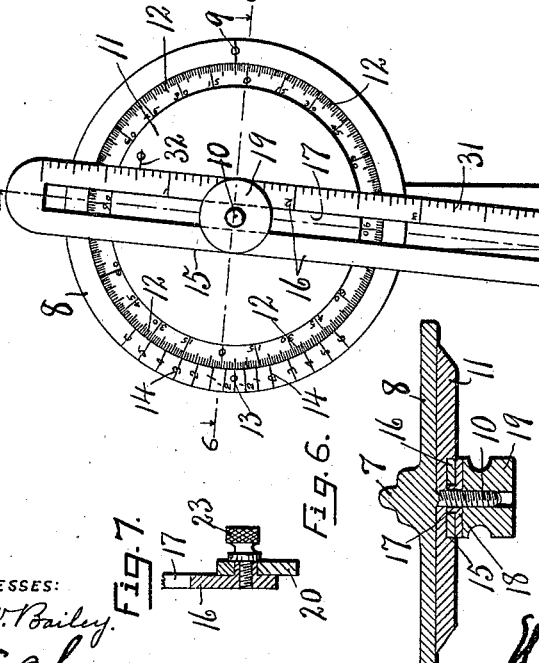
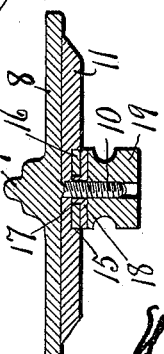
WITNESSES:
R. W. Bailey.
H. E. Chase.
INVENTOR:
J. E. Ball
By Howard P. Denison
ATTORNEY.

J. E. BALL.
TAPER GAGE.
APPLICATION FILED JUNE 18, 1910.

996,901.

Patented July 4, 1911.

2 SHEETS—SHEET 2.

UNITED STATES PATENT OFFICE.

JOSEPH E. BALL, OF SYRACUSE, NEW YORK.

TAPER-GAGE.

996,901.   Specification of Letters Patent.   Patented July 4, 1911.

Application filed June 18, 1910. Serial No. 567,632.

*To all whom it may concern:*

Be it known that I, JOSEPH E. BALL, of Syracuse, in the county of Onondaga, in the State of New York, have invented new and useful Improvements in Taper-Gages, of which the following, taken in connection with the accompanying drawings, is a full, clear, and exact description.

This invention relates to certain improvements in gages and refers more particularly to taper gages for measuring the angles or degrees of taper of tapered or beveled objects, and at the same time indicating the degree of incline, taper or bevel of such objects in inches per foot in length.

The main object is to simplify the construction and adjustment of this class of instruments and at the same time to increase its range of usefulness and accuracy of measurement.

Another object is to provide means for accurately centering objects of circular cross section with reference to the contact bar so that the instrument may be more readily adjusted to measure the angle or taper of such object.

Another object is to graduate the contact bar so that the length of the taper of the object may be determined in the same operation of measuring the angle.

A still further object is to provide the supporting-arm in the contact bar with graduations whereby the diameters of various objects may be measured.

Other objects and uses relating to specific parts of the instrument will be brought out in the following description.

Figure 8:
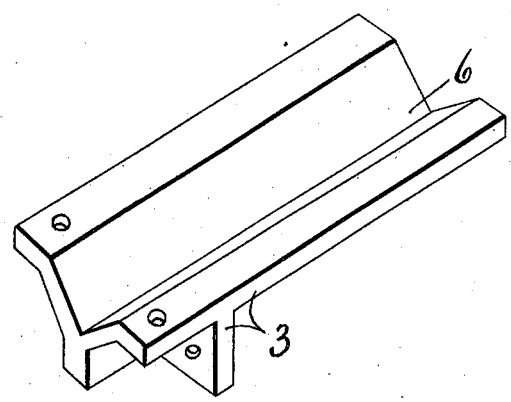
Figure 9:
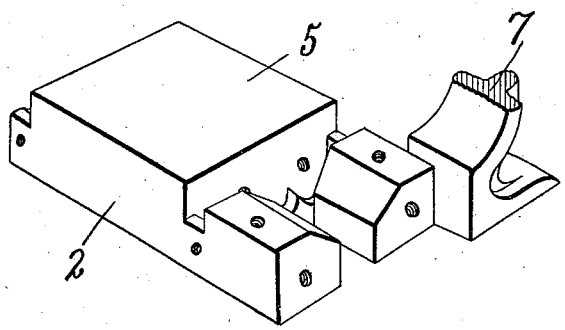

In the drawings: Figure 1 is a front elevation of my improved taper gage shown as applied to measuring the angle of a tapered body, a portion of the supporting-base or rest being shown in section to disclose one of the fastening means. Fig. 2 is a side elevation of the same device showing the dial, dial-supporting head and clamping devices in section. Fig. 3 is a horizontal sectional view, taken on line 3—3 Fig. 2, showing particularly the main supporting-base or rests, portion of which is broken away. Fig. 4 is an end view of the right hand end of the device shown in Fig. 3. Fig. 5 is a transverse sectional view taken on line 5—5 Fig. 1, showing particularly the inner set of centering-arms. Fig. 6 is a horizontal sectional view through the dial and dial-plate, taken on line 6—6 Fig. 1. Fig. 7 is a vertical sectional view taken on line 7—7 Fig. 1. Figs. 8 and 9 are perspective views of the detached sections of the supporting base.

In carrying out the objects stated, I provide a suitable supporting base —1— composed of sections —2— and —3— secured together end to end by any suitable fastening means, as screws —4—, the section —2— being provided with a flat bearing face —5— Figs. 1 and 9, while the section —3— is provided with a V-shape bearing face —6— Figs. 3 and 8 depressed below the bearing face —5—, the base of the groove bearing face —6— being disposed in a plane substantially parallel with that of the flat face —5—. These bearing faces constitute rests for receiving and supporting the object or article, as —a—, the taper or bevel of which is to be measured, the flat face —5— being used to support round taper articles when it is desired to measure the taper of included angles of diametrically opposite sides, while the groove —6— is used when it is desired to duplicate a previously formed taper.

The object in making the base in two parts as described, is more for convenience in accurately forming the V-shape groove —6— in the section —3— and also to facilitate the placing in position of the inner centering devices hereinafter described, otherwise the entire base might be made in one piece.

Secured to and projecting rearwardly and upwardly from the rear side of the base is a bracket —7— terminating at its upper end in a circular head —8— which bears upon its front marginal face a fixed index —9—, as best seen in Fig. 1.

Centrally secured to the circular head —8— is a forwardly projecting threaded stud or screw —10— upon which is journaled a circular concentric dial plate —11— having the front face of its marginal edge preferably beveled and provided with a series of, in this instance four, sets of graduations —12—, each numbered from 0 to 90, inclusive, and representing degrees, one of the 0 graduations being normally registered with the fixed index —9—, while the diametrically opposite 0 graduation is normally registered with a fixed 0 index mark —13— on the adjacent front side of the head —8—. This portion of the head —8— is also graduated at —14— in opposite directions from the 0 index to represent inches of incline per foot in length of tapers or bevels. These inch graduations are numbered consecutively in opposite directions from the 0 index —13— and correspond to certain degrees or angles indicated by the graduations —12—, that is, if the dial —11— is adjusted rotarily to bring the 5 degree graduation into registration with the 0 index —9—, the opposite graduations —13— will indicate the bevel in inches per foot in length of such angle.

The front face of the dial is provided with a diametrically extending groove or recess —15— in which is slidably fitted a longitudinally adjustable arm —16— having a lengthwise slot —17— for receiving the screw —10—, and a suitable guide plate —18— also mounted on the screw and fitting closely in the slot —17— to guide the arm —16— in its longitudinal adjustment.

The thickness of the arm —16— is substantially the same as the depth of the groove —15—, so that the front face of the arm is substantially coincident with that of the face of the dial and is adapted to be engaged by a clamping nut —19— on the screw —10— for simultaneously clamping the arm —16— and dial in their adjusted positions.

Secured to the lower end of the arm —16— is a longitudinally adjustable contact bar —20— having its lower edge disposed at right angles to the plane of movement of the arm —16— and also in a plane substantially coincident with the base of the groove —6— and longitudinal center of the flat bearing face —5—, so that when the 0 graduations on the dial —11— are registered with the corresponding 0 indexes —9— and —13— on the head —8— the arm —16— will be disposed in a vertical position at right angles to the base of the groove —6— and bearing face —5—, while the lower edge of the contact bar —20— will be parallel with the base of said groove and flat bearing face —5—. It therefore follows that if a tapered or beveled article is laid upon the flat bearing face —5— and the arm —16— and contact bar adjusted rotarily to bring the lower straight edge of the contact bar into engagement with the upper face of the bevel or taper, the graduations —12— on the dial —11— will indicate the exact degree or angle of taper, while the opposite graduations —14— will indicate the taper or bevel in inches per foot in length.

If it is desired to reproduce the taper of the article, as —a—, the latter may be placed in the groove —6— and the arm —16— and contact bar —20— adjusted to bring the lower straight edge of the latter into contact with the bevel after which the clamping nut —19— is tightened to hold these parts in their adjusted position so that in reproducing the taper in duplicate the latter may be inserted in the groove and against the lower straight edge of the bar —20— to test the accuracy of its taper.

In so far as testing of duplicate tapers or angles is concerned, this test may be made either in the groove of the member —3— or on a flat surface of the section —2— between the arms —24— and —24'— but the groove is more convenient in that the tapered article is more conveniently placed and centered therein but is not adapted to coöperate with the contact bar —20— in the measurement of including the angles and therefore I provide the section —2— with a flat upper face and the centering arms —24— and —24'—. Aside from the greater convenience in the use of the groove member —3— for testing duplicate tapers, the groove might be dispensed with and all of the tests made upon a flat upper surface between the arms —24— and —24'—.

The contact bar —20— is adjustable laterally to permit it to be brought into contact with tapers of small angles which may rest in the groove —6— and also for convenience in measuring the lengths of the taper of articles which may rest upon the flat bearing face —5— and for this purpose is provided with a lengthwise slot —21— which receives a closely fitting lateral projection —22— on the lower end of the arm —16—, said contact bar being held in its adjusted position by a clamping screw —23—, as best seen in Figs. 1, 2 and 7.

The V-shape groove —6— serves as a means for centering round tapered articles with reference to the lower straight edge of the contact bar —20— so that the latter may be brought into engagement with the portion of the taper or other round article at the side diametrically opposite to the base of the groove, thereby expediting the work of setting the instrument for reproducing certain tapers or angles.

In order that similar objects or articles may be properly centered when supported upon the flat face —5—, I provide separate sets of centering arms —24— and —24'— arranged in pairs, some distance apart, lengthwise of the section —2— and at opposite sides of the longitudinal center of such section.

The arms —24— and —24'— at opposite sides of the longitudinal center of the section —2— are pivotally mounted for independent movement upon parallel supporting rods or bolts —26— running through apertures from end to end of said section, those of each coacting set being connected for simultaneous action by intermeshing gears or toothed segments —27— and spring pressed toward each other by one or more springs —28—, as best seen in Figs. 1, 2 and 5.

The coacting sets of centering members

—24— and —24'— are positioned so that when brought together their meeting faces lie in substantially the same vertical plane as the lower straight edge of the contact bar —20— and their upper ends are usually deflected laterally in opposite directions so as to permit the article to be measured to be pressed between them and against the upper bearing face of the base, thereby spreading the centering devices apart. During this spreading of the centering devices they are spring pressed against opposite sides of the object under test, and thereby serve to center said object to bring its vertical diameter in a plane coincident with that of the contact bar, so that when the latter is adjusted to measure the angle of taper or bevel it will engage the top face of the object in the plane of its vertical diameter.

The outer coacting set of centering devices are adapted to engage the larger portion of the object, while the inner set of centering devices are adapted to engage a smaller portion of the taper, each set acting independently of the other to keep the axis of the object in a plane coincident with that of the contact bar. These centering devices may be clamped in their adjusted position by simply tightening one of the bolts —26— which is provided at its inner end with an enlarged head for engaging the end face of the adjacent gear —27—, the opposite end of said bolt being screw threaded and provided with a nut —26'— engaging the end face of the adjacent gear, so that by tightening the nut it together with the inner head of the bolt will frictionally clamp the adjacent gears against the corresponding end faces of the base section —2— thereby holding the centering arms in their adjusted positions.

The contact bar —20— is provided along its lower edge with graduations —29— representing inches and fractions thereof, and numbered consecutively from one end for the purpose of measuring the length of tapers, bevels and similar dimensions. The opposite ends of this bar are straight and disposed at right angles to the lower edge and may be used for measuring angles, one of said edges being provided with graduations —30— representing inches and fractions thereof and may be used for vertical linear measurements. The arm —16— is also provided along one edge with graduations —31— representing inches and fractions thereof and adapted to be registered with a fixed graduation —32— on the dial —11— for measuring diameters and other thicknesses which may be placed between either of the bearings —5— or —6— and lower edge of the contact bar —20—, said graduations —31— being numbered from the top downward in such manner that the 0 graduation is registered with the fixed index —32— when the lower edge of the contact bar —20— is engaged with the upper flat bearing face —5—.

What I claim is:

1. In a taper gage, a base having a V-shape groove in the upper side thereof for centering an object the taper of which is to be measured, a bracket secured to and rising from said base at the rear side thereof, a dial supporting head secured to the upper end of the bracket, a dial rotatably mounted on said head and provided with graduations representing degrees of a circle, a rock arm slidably interlocked with the dial to rotate the latter as the arm is rocked, said arm being adjustable diametrically of the dial toward and from the base and having its lower end provided with a straight edge disposed in the same vertical plane as that of the base of the groove.

2. A taper gage comprising a base having a groove in its upper side for receiving an article the taper of which is to be measured, a bracket rising from the base at one side of the groove, a dial supporting head on the upper end of the bracket directly over the groove, a rotary dial on the head provided with graduations representing degrees of a circle, a rock arm slidably mounted on the dial to rotate therewith and adjustable transversely thereof, and means to clamp the arm to the dial, said arm having a straight edge disposed in the same vertical plane as the base of the groove.

3. A taper gage comprising a base, a bracket rising from the base, a rotary dial journaled on the bracket, an arm slidable radially on and rotatable with the dial, a contact bar on the arm and means on the base for centering an article, the taper of which is to be measured with reference to said bar.

4. A gage comprising a base, movable centering means for an article, the taper of which is to be measured, a bracket rising from the base and provided with a head, a rotary dial journaled on the head, said head and dial having graduations to indicate the relative position of the dial, an arm rotatable with the dial, and a contact bar on said arm.

5. A taper gage comprising a base having a V-shape groove in its upper side, a bracket rising from the base and rigidly secured thereto, a dial rotatably mounted on the head, separate sets of graduations on the head and dial concentric with the axis of said dial in a plane parallel with the groove, an arm rotatable with the dial, and a contact bar on the arm and having its contact face in the same vertical plane as that of the base of the groove.

6. A taper gage comprising a base, having downwardly converging bearings for an article, the taper of which is to be measured, a bracket secured to and rising from the base, a head on the bracket, a dial rotatably mounted on the head, an arm mounted on the dial and slidable radially thereof, said arm having a contact bar movable along and in the vertical plane of the apex of the downwardly converging bearings, graduations on the dial concentric with its axis for indicating its degree of rotation from a predetermined position, and graduations on the arm for indicating its amount of radial adjustment.

7. A taper gage comprising a base, centering arms pivoted to and rising from the base, a bracket secured to and rising from the base above said arms, a dial rotatably mounted on the bracket above the arms, and a contact device rotatable with the dial and having a portion thereof movable between said arms.

8. A taper gage comprising a base, a bracket secured to and rising from the base, a dial rotatably mounted on the bracket, centering members on the base connected for simultaneous movement in reverse directions, and a contact device mounted on the dial and having a portion thereof movable between the centering members.

9. A taper gage comprising a base, a bracket rising from the base, a rotary dial on the bracket, a pair of centering members mounted on the base and movable toward and from each other, and a contact device mounted on the dial and adjustable radially thereof, said device having a portion thereof movable between the centering members.

In witness whereof I have hereunto set my hand on this 11th day of June 1910.

JOSEPH E. BALL.

Witnesses:
H. E. CHASE,
A. L. HUMPHREY.

---

Copies of this patent may be obtained for five cents each, by addressing the "Commissioner of Patents, Washington, D. C."